Aug. 30, 1932.  R. SHOWMIN  1,874,818
VALVE MECHANISM
Filed May 14, 1930   3 Sheets-Sheet 2

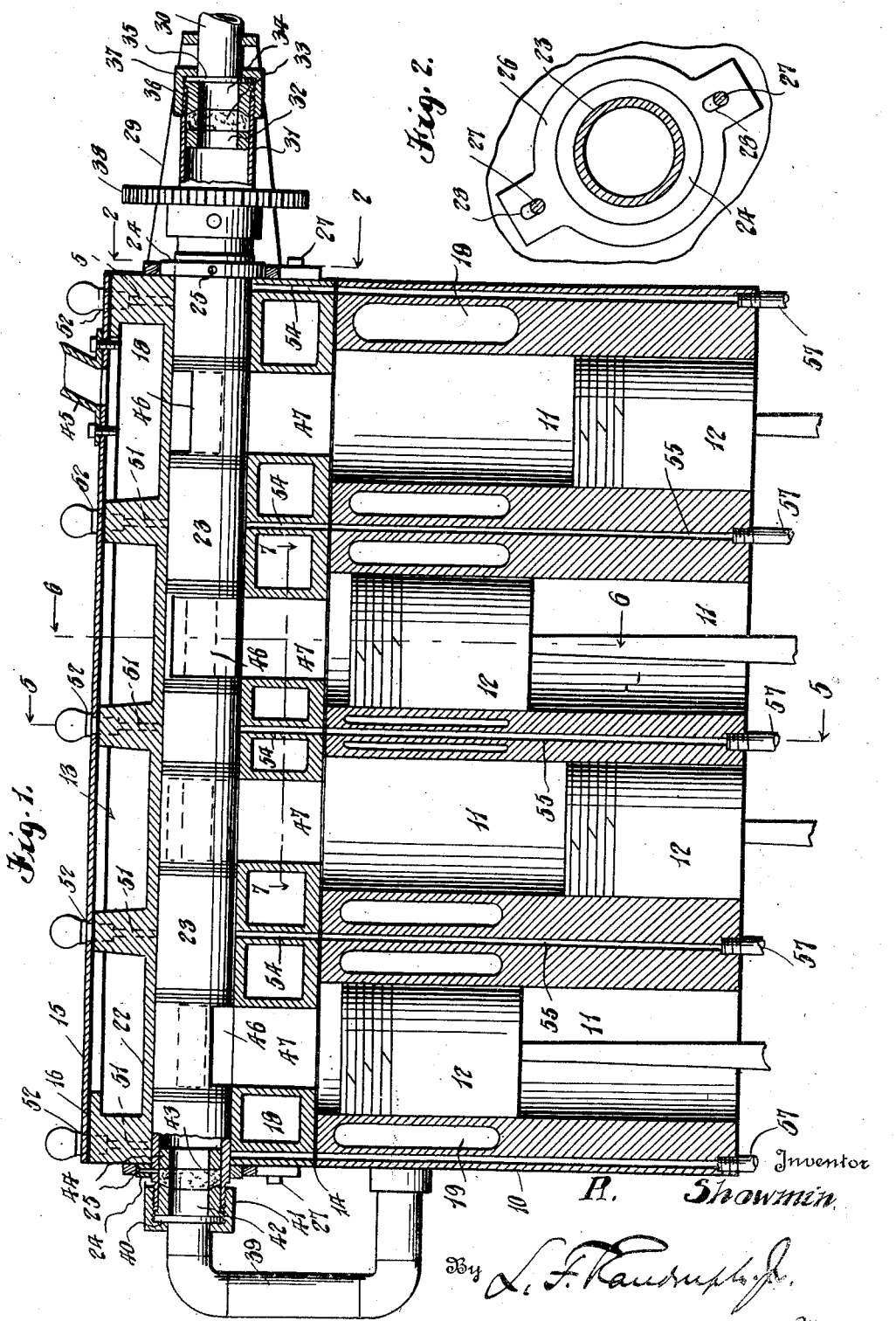

Inventor
R. Showmin,
By L. F. Randolph Jr.
Attorney

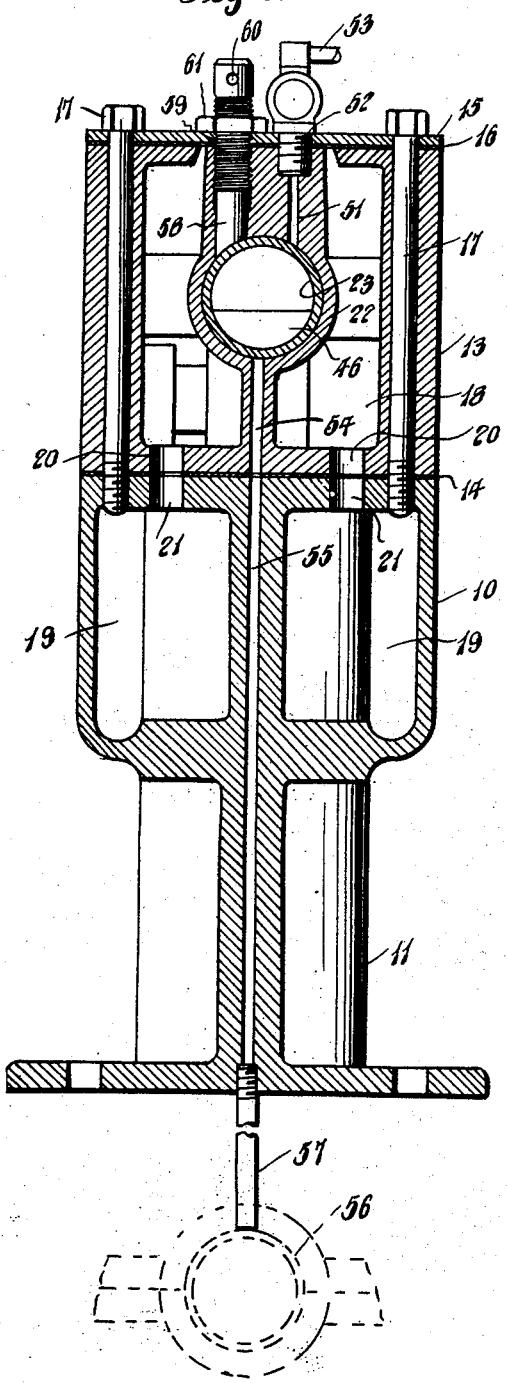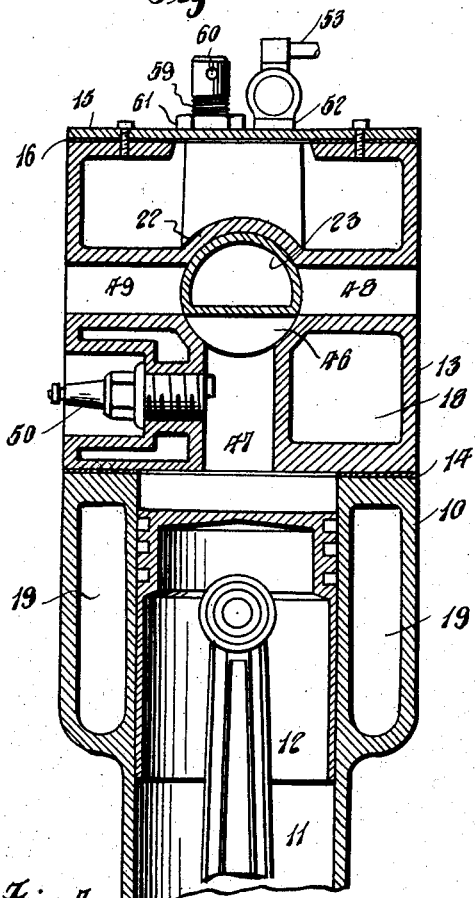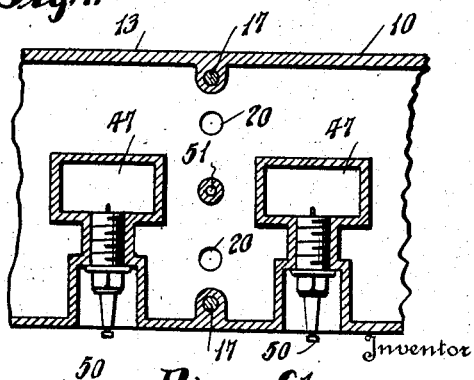

Patented Aug. 30, 1932

1,874,818

UNITED STATES PATENT OFFICE

ROSS SHOWMIN, OF ROSSFORD, OHIO

VALVE MECHANISM

Application filed May 14, 1930. Serial No. 452,433.

This invention relates to a valve mechanism for internal combustion engines and is an improvement of the construction disclosed in my Patent Number 1,798,040, March 24, 1931.

It is a prime object of the present invention to provide a more efficient means for maintaining the rotary valve in contact with its seat and particularly maintain it in intimate contact with the seat adjacent the intake and exhaust port.

A further object is to provide a construction wherein adjusting means is provided adjacent each cylinder and wherein the same is adjustable from locations exteriorly of the engine head.

Another object is to provide a novel construction whereby the valve is lubricated and surplus lubricant descends through the cylinder block and is guided onto connecting rod bearings.

A further object is to provide a novel construction wherein the valve is secured in proper longitudinal adjustment and in place in the cylinder head.

Various additional objects and advantages will become apparent from a consideration of the description following taken in connection with accompanying drawings illustrating an operative embodiment.

In said drawings:—

Figure 3:
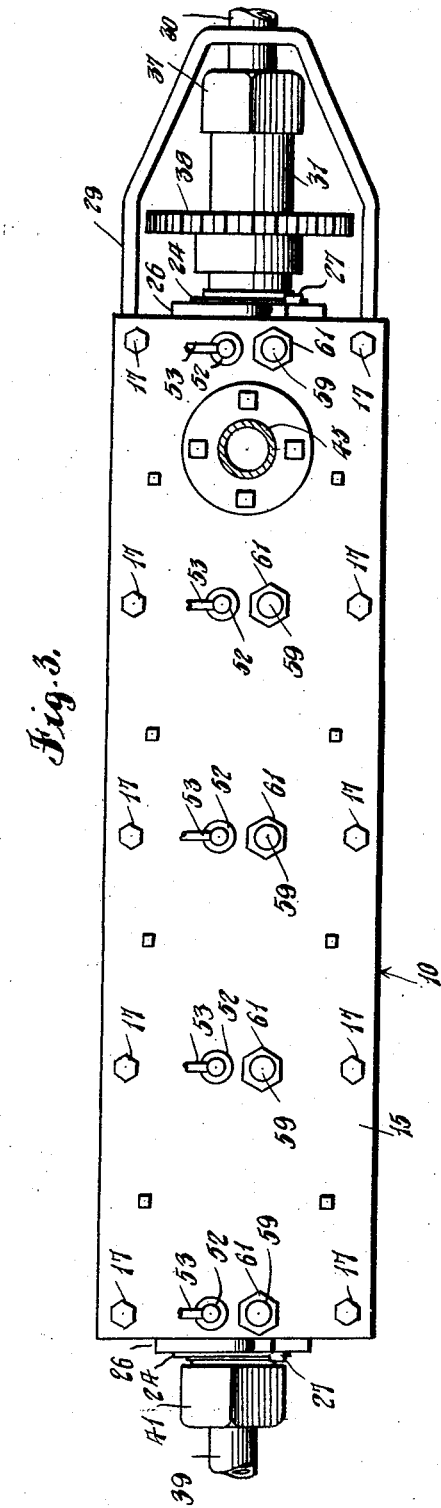
Figure 4:
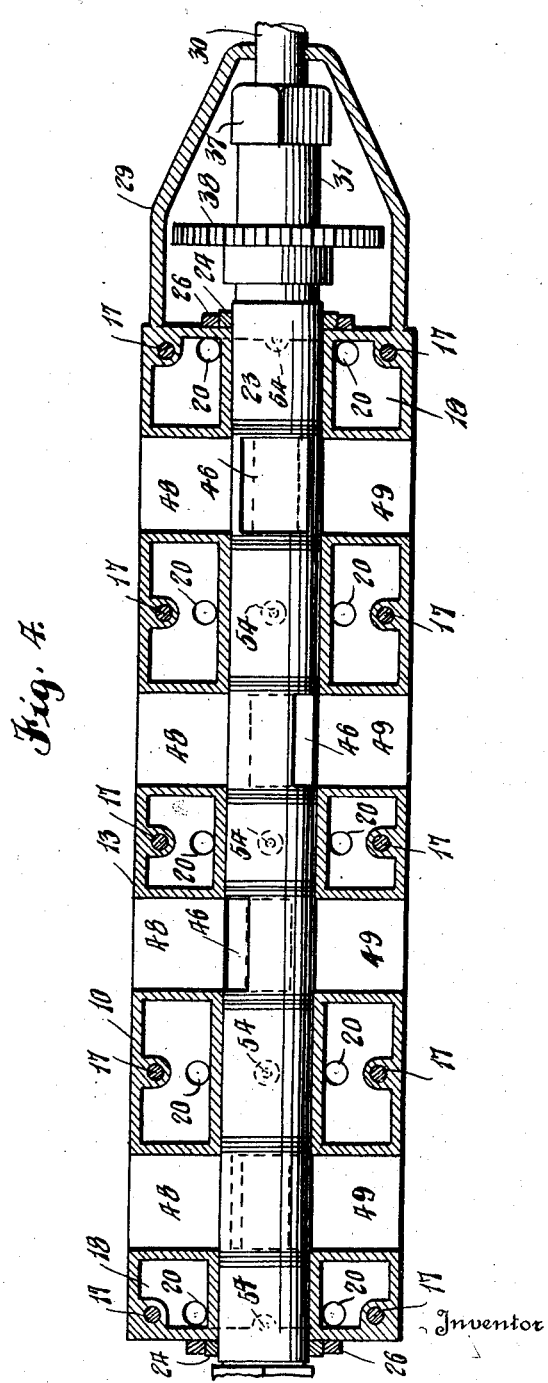

Figure 1 is a central longitudinal vertical sectional view through the principal part of an internal combustion engine embodying my improvements, Figure 2 is a cross sectional view taken on the line 2—2 of Figure 1, Figure 3 is a plan view of the engine, Figure 4 is a view in horizontal section through the engine at the axis of the valve, Figure 5 is a cross sectional view taken through the engine on the line 5—5 of Figure 1, Figure 6 is a cross section of the view taken through the engine on the line 6—6 of Figure 1, and Figure 7 is a horizontal sectional view taken on the line 7—7 of Figure 1.

Referring specifically to the drawings 10 designates the cylinder block of my improved engine, the same being adapted for communication in the usual way with the crank case and lower portion. Such block embodies the usual cylinders 11 in which pistons move and are driven in proper sequence.

Surmounting the block 10 is the engine head 13, a gasket 14 being interposed between the block and head. A closure plate 15 surmounts the head, a gasket 16 being interposed between the same and head. Bolts 17 pass through the plate 15, head 13, and cylinder block 10, being threaded to the latter, removably and adjustably securing the parts together. The engine is of the water cooled type and the head 13 and cylinder block have communicating passages for the water as at 18 and 19, respectively, the ports of communication between them being designated 20 and 21, respectively.

Longitudinally disposed and substantially centrally of the head is an annular wall 22 serving as a bearing for a rotary valve structure 23. This valve 23 is held against displacement from the head by means of rings or collars 24, one at each end thereof, held in place thereon by set screws 25 which bind against the valve to permit adjustment to take up wear or longitudinal play. Such collars or rings 24 are located and have bearings in yokes 26 which are adjustably secured against opposite ends of the head 13, by means of bolts 27 passing through enlarged slots 28 of the yokes.

Integral with one end of the head is an open U-shaped bearing 29 for a water supply pipe 30. The valve has an extension 31 surrounded by such and within the same is an abutment ring 32, fixed thereto in any suitable manner. Packing 33 to provide a water-tight joint is disposed against the ring 32 and a follower 34 engages the packing. The supply pipe 30 is fixed and has a flange 35 at its inner end. Such flange 35 bears against the follower 34 and it is clamped in that position and the parts in water-tight relation by a cap 36 threaded to the valve 31 and having an inturned flange 37 overlapping the flange 35. This construction connects the valve for rotation with the pipe 30 in water-tight relation thereto. Fixed on the valve extension 31 within the bearing frame 29, is a gear wheel 38 which may be driven by any suitable train of gearing or means from the crank shaft of the engine.

At the other end of the valve, it is swivelly connected with a pipe or conduit 39 which discharges the water into the jacket space 19 of the cylinder block. Such pipe 39 adjacent the valve has a flange 40 which is overlapped by a flange of a screw cap 41 threaded on the valve. The flange 40 abuts a follower 42 located within the valve, which compresses packing 43 against a fixed ring 44 within the valve. The outlet for the water to return to the radiator, is shown at 45 and preferably connected to the plate 15.

The valve is generally of the construction disclosed in the pending application aforesaid, having arcuate valve portions 46 arranged in proper axial relation with respect to firing chambers 47 provided in the head 13 and with intake passages 48 and outlet or exhaust passages 49. Spark plugs 50 are carried by the head so as to fire the explosive charge within the chambers 47. The charges are fired in proper sequence as disclosed in the aforesaid application.

Oil passages are provided in the head 13 at 51 and lead to the valve seat. Screw threaded into the head and communicating with each passage 51 is an oil fitting 52 arranged through pipe 53 with the oil pump or pressure line of the lubricating system for the engine. The lubricant passing through the passages 51 effectively lubricates the valve and applied in such quantity that it leaves the seat through communicating passages 54 and 55, provided in the head 13 and block 10 so as to be discharged onto the main or connecting rod bearing 56 located in the crank shaft case of the engine. In order that such lubricant may be discharged directly onto such bearing, pipes 57 are screw threaded to the cylinder block 10 as shown. At five different and equally spaced locations, adjusting blocks 58 bear against the valve 23. These blocks are engaged by screws 59 threaded into the plate 15 and said head 13. The screws 59 are individually operable in order to move the blocks 58 against the valve to adjust it relatively to its seat or take up wear. Such screws 59 are operable exteriorly of the engine, which is a decided advantage over the construction of my previously mentioned application and the head of each screw is provided with an opening 60 through which a rod, crank or other element may be passed to give leverage for turning the screw. Lock nuts 61 are threaded on the screws and adapted for tightening against the plate 15. The adjustment by means of the screws 59 and blocks 58 coact with the adjustment of the position of yokes 26 in properly positioning the valve against wobbling and in contact with efficient bearing or supporting surfaces.

Various changes may be resorted to provided they fall within the spirit and scope of the invention.

I claim as my invention:—

1. In an engine of the class described, a rotary valve, blocks in contact therewith, and screws operable from the exterior of the head to adjust said blocks to position the valve.

2. In an engine of the class described, a rotary valve, blocks in contact therewith, screws operable from the exterior of the head to adjust said blocks to position the valve, said screws being located off-center with respect to the valve, and yoke means in which the valve has bearing adjustable with respect to said blocks.

In testimony whereof I affix my signature.

ROSS SHOWMIN.